Figure 1:
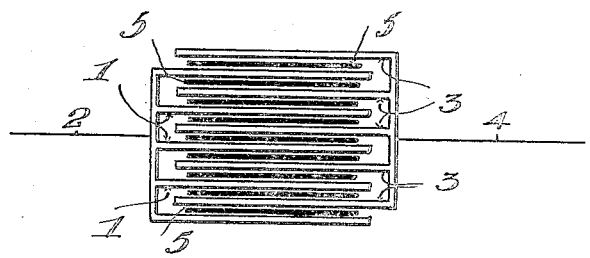

J. W. AYLSWORTH.
ELECTRICAL CONDENSER.
APPLICATION FILED NOV. 8, 1913.

1,111,289.  Patented Sept. 22, 1914.

UNITED STATES PATENT OFFICE.

JONAS W. AYLSWORTH, OF EAST ORANGE, NEW JERSEY, ASSIGNOR TO HALOGEN PRODUCTS COMPANY, OF GLEN RIDGE, NEW JERSEY, A CORPORATION OF NEW JERSEY.

ELECTRICAL CONDENSER.

1,111,289. Specification of Letters Patent. Patented Sept. 22, 1914.

Application filed November 8, 1913. Serial No. 799,932.

*To all whom it may concern:*

Be it known that I, JONAS W. AYLSWORTH, a citizen of the United States, and a resident of East Orange, in the county of Essex, State of New Jersey, have invented certain new and useful Improvements in Electrical Condensers, of which the following is a description.

My invention relates to electrical condensers, and my object is to provide improved electrical condensers in which the insulating material used to separate the conducting strips or portions is formed of, or comprises, a composition which I have discovered to be particularly well adapted for the purpose. The said composition, comprising one of a group of substances to be hereinafter described, or a mixture of two or more of the same, when used in the manner indicated, possesses the desirable properties of high specific inductive capacity, high dielectric strength, and low conductance, as well as other useful properties, to a remarkable degree. The composition referred to may be briefly described as a halogen substitution product of a carbo-cyclic hydro-carbon containing one or more closed chains.

Condensers made in accordance with my invention are of improved capacity, for given dimensions of dielectric, and improved reliability, so that they may be made smaller for a given capacity, and hence cheaper, while at the same time condensers of large size and area of dielectric may readily be made by my invention.

My object is accordingly to provide condensers of the desirable properties and wide range of usefulness indicated.

It has heretofore been impracticable to use electro-static condensers in alternating current circuits of large kilovolt-ampere capacity because of the great bulk and expense of the condensers required, the liability of the same to rupture because of insufficient dielectric, and because of energy losses due to leakage through the insulation used between the plates or other form of conductor and in the condenser, due to conductance of the insulation.

By my present invention the capacity of condensers of practicable size and cost is so much increased, while at the same time the other properties noted above of the improved condenser, of high dielectric strength, low conductance, etc., are so favorable, that the extended use of condensers in this and other new fields is made possible. A substantial economy and greater efficiency of condensers are also gained in their present field of usefulness, such as in connection with spark ignition circuits, telegraph and telephone circuits, electrical measuring instruments and the like.

A condenser made in accordance with my invention comprises alternate layers of a conductor and an insulating separator, as is common, each alternate conductor being electrically connected to form one terminal and the intermediate conductors being connected to form the other terminal. Within my invention, condensers may be constructed in any of the well-known forms, such as plate, cylinder, disk, or coil condensers, and the conducting elements may be of any suitable or known material used for the purpose. My improvement is due, as stated, to the advantages of the novel insulating material used by me between the conducting members of the condenser, the advantages referred to amounting to a substantially new and unexpected result. The insulation, of the class of bodies referred to, may be coated on the conductor members of the condenser before assembling the latter, or it may be impregnated in or coated on paper or other fabric, before construction of the condenser, and the insulators thus formed mounted in place; or the conductors may be separated by paper or other fabric and the partly completed condenser then impregnated with the insulating material in molten or fluid condition.

In order that my invention may be clearly understood attention is hereby directed to the accompanying drawing, forming part of this application, and illustrating one form of my invention.

Figure 2:
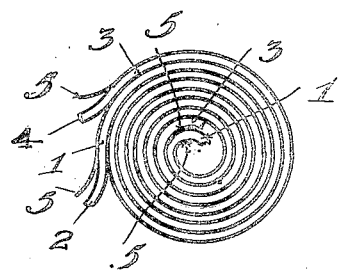

In the drawing, Figure 1 illustrates diagrammatically in cross section a plate condenser formed in accordance with my invention, and Fig. 2 similarly illustrates a coil condenser.

In the drawings, the conducting members, 1, 1, 1, are connected together and to one terminal 2, of the condenser, and the conducting members 3, 3, 3, are connected together and to the other terminal 4, the conducting members or plates being separated by sheets or coatings 5 of insulation of the character referred to.

I have found that the solid halogen substitution products of the carbo-cyclic hydrocarbons, containing one or more closed chains, as a class possess high specific inductive capacity, and high dielectric strength, while their conductance is very low and their melting points may be selected or manipulated by mixing two or more of these substances together, to suit desired requirements. Bodies in this class which I have found to be suitable for the desired purpose, either alone or in admixture with each other, are the following:—The solid halogen substitution products of benzene, the toluenes, naphthalenes, and anthracene, and the solid oxidation products of the above bodies. In accordance with my invention any of the above may be used, or other bodies of the general class referred to having equivalent properties. It is, further, not essential that the insulation be composed of one of the definite pure substances named above. Mixtures of the various isometric modifications of these bodies, as well as various stages of intermediate halogen substitution, are effective. The physical state of these bodies may also be altered by additions of small percentages of other bodies, such as resins and resinous gums miscible therewith, for the purpose of altering melting points, and rendering the bodies less crystalline.

I prefer to use the halogen substitution products referred to after they have been purified by distillation, which decomposes and separates the loosely-attached or addition halogen compounds from the true and stable substitution products.

Of the above-named substances I prefer, in most instances, to use the halogen substitution products of naphthalene, because of the smaller cost of these bodies, and their excellent properties for the desired purpose. Suitable examples are the tri-, tetra- or hexa-chloro-naphthalenes, or mixtures of the same, all of which are solid substitution products.

In selecting the body or bodies to be used in my invention, from the members of the general class referred to, due consideration must be paid to the physical properties of the compound in reference to the construction and uses of a desired condenser. It is obvious that bodies having a very low melting point cannot well be used when the temperature becomes elevated, and that bodies which have very high melting points cannot readily be applied without the admixture of some substance miscible therewith and adapted to lower its melting point. The best substance or compound for a given installation may be determined, from among those described by me, by test and a consideration of the above factors.

The specific inductive capacity, of the halogen substitution products and mixtures described above as comprised within my invention, when utilized as the dielectric element in a condenser, varies from 100 per cent. to over 300 per cent. of that of paraffin under parallel conditions of test. The other desirable properties for a condenser dielectric referred to above are also possessed by the compounds described to a marked degree. The conductance of these substances, for example, is very low ranging from $3 \times 10^{-14}$ to less than $1 \times 10^{-14}$ reciprocal ohms per centimeter cube.

It will be understood that in the claims, the terms "halogen substitution product" and "halogen-containing compound" of one of the bodies referred to above are intended generically to include the quinones or oxidation products of the said substitution or halogen-containing products and also mixtures and isomeric modifications of the same, and that when the term "solid oxygen compound of a halogen substitution product" of one of the bodies referred to, or the like, appears in the claims, the same is intended as a specific preferred form of such substitution products. Some of these oxygen compounds have specific inductive capacities exceeding 500 per cent. of that of paraffin.

The halogen substitution products referred to are preferably distilled, as stated, and if an oxidation product of one of these bodies is used, the substitution product is preferably distilled before being oxidized. The distilled solid chloro-naphthalenes and other substitution products referred to are characterized by complete stability, because of the elimination of addition compounds, by the high heat of distilling the product, either alone or in the presence of a small percentage of a basic oxid, such as lime. Distillation products made as indicated are absolutely stable when heated to temperatures equal to or lower than their boiling points, whereas halogen substitution products not distilled contain some addition products as well, which continuously cause the evolution of hydrochloric acid, when the substance is heated to a sufficient temperature, of, for example, 300° F. and higher. This formation of hydrochloric acid impairs the dielectric strength of the product.

The oxidization compounds of solid chloro-naphthalenes and similar bodies are described in my application. Insulating compounds, Serial No. 641,326, filed July 29, 1911. The oxidation products are generally more flexible than the products which have not been treated by an oxidizing agent, and are of high dielectric strength, insulation resistance, and remarkable specific inductive capacity.

As examples of several of the insulating substances described in this application, for use in condensers, and properties of the same, the following may be given:

1. Distilled solid chloro-naphthalene, in which the chlorination has proceeded to such a point that the resulting mixture of chloro-naphthalenes, when distilled, corresponds in chlorin content to approximately tri-chloro-naphthalene:

Specific inductive capacity at 25° C.
(inductivity) _____ 2.62
Dielectric strength _____ 122 volts per mil the test piece being 142 mils thick.
Melting point _____ 180 to 190° F.

2. Tri-chloro-naphthalene, the same as in Example 1, oxidized by a powerful oxidizing agent such as fuming nitric acid, or a mixture of chromic and acetic acid, and subsequently treated with an alkali, and thoroughly washed:

Specific inductive capacity _____ 12.0
Dielectric strength _____ 450 volts per mil on a test piece 78 mils thick.
Melting point about _____ 180° F.

3. Tetra-chloro-naphthalene, similar to Example 1, distilled:

Specific inductive capacity _____ 3.41
Dielectric strength _____ 271 volts per mil on a test piece 137 mils thick.
Melting point _____ 224° F.

4. Hexa-chloro-naphthalene (distilled):

Specific inductive capacity _____ 3.49
Dielectric strength _____ 128 volts per mil (test piece) 135 mils thick).
Melting point _____ 260° F.
Insulation resistance (reciprocal of conductivity) ranging 9/10x10-14 and less _____ Especially good.

Paraffin when treated under parallel conditions with the above tests has a specific inductive capacity of 1.81, dielectric strength of 348 volts per mil on a thickness of 140 mils, and a melting point of 140° F.

I find that when ortho cresol resin is mixed in small proportions with the materials described above, it increases the dielectric strength of the compound and renders the product less crystalline than it would otherwise be without materially altering the specific inductive capacity of the body. The ortho cresol resin to which I particularly refer, is that described in my application Serial No. 703,199, Cresolic varnish compositions, filed June 12, 1912. As there described, the cresol resin which is soluble in various hydrocarbon and varnish oils and molten waxes, is preferably prepared by heating together 30 parts ortho cresol with from 14 to 16 parts of a 40 per cent. solution of formaldehyde, the heating taking place in an autoclave to cause the desired reaction which takes place at a temperature of about 270° F. Also a small amount of water up to 8 parts may be added if desired, to decrease the violence of the reaction.

For an example of the properties of the compound including the ortho cresol resin, it may be stated that the same material as used in Example 3 given above, when mixed with 6 per cent. of ortho cresol resin gave Specific inductive capacity _____ 3.00
Dielectric strength _____ 359 volts per mil on a test piece 129 mils thick.

Also the material used in Example 4 above with the addition of 6 per cent. ortho cresol resin gave Specific inductive capacity _____ 3.26
Dielectric strength _____ 320 volts per mil on a test piece 146 mils thick.

Tests made in the various examples given were made at 25° C. The same specimens tested at 42° C. showed increases in specific inductive capacity ranging from 3 to 16 per cent., whereas paraffin under the same conditions of test showed a decrease of 4.6 per cent. It is obvious that some of the bodies described are more constant under temperature variations than paraffin and that others of them have the property of marked improvement in capacity with increase of temperature which for some uses is desirable. It has further been observed that the dielectric strength is but slightly affected by ranges of temperature between 25° C. and 60° C. in comparison with paraffin and other solid dielectrics which are greatly impaired by the same increase of temperature.

Having now described my invention what I claim and desire to protect by Letters Patent is:—

1. As a new article of manufacture, an electrical condenser comprising electrically-conducting members separated by insulating members comprising a solid halogen substitution product of a carbo-cyclic hydrocarbon containing one or more closed chains, substantially as described.

2. As a new article of manufacture, an electrical condenser in which the dielectric employed comprises a solid halogen substitution product of a carbo-cyclic hydrocarbon containing one or more closed chains, substantially as described.

3. As a new article of manufacture, an electrical condenser comprising electrically-conducting members separated by insulating members comprising a solid halogen substitution product of naphthalene, substantially as described.

4. As a new article of manufacture, an electrical condenser comprising electrically-conducting members separated by insulating members comprising a solid halogen substitution product of naphthalene, associated with ortho-cresol resin, substantially as described.

5. As a new article of manufacture, an electrical condenser in which the dielectric employed comprises a solid halogen substitution product of a carbocyclic hydrocarbon containing one or more closed chains, compounded with a small percentage of a phenolic resin miscible therewith, substantially as described.

6. As a new article of manufacture, an electrical condenser in which the dielectric employed comprises a solid halogen substitution product of a carbo-cyclic hydrocarbon containing one or more closed chains, compounded with a small percentage of a resinous compound, substantially as described.

7. As a new article of manufacture, an electrical condenser in which the dielectric employed comprises a solid halogen substitution product of an aromatic hydrocarbon, substantially as described.

8. As a new article of manufacture, an electrical condenser comprising electrically-conducting members separated by insulating members comprising a fabric carrying a solid halogen substitution product of a carbo-cyclic hydrocarbon containing one or more closed chains, substantially as described.

9. As a new article of manufacture, an electrical condenser comprising electrically-conducting members separated by insulating members comprising a fabric carrying a solid halogen substitution product of naphthalene, substantially as described.

10. As a new article of manufacture, an electrical condenser in which the dielectric employed comprises a solid stable halogen-containing compound of a carbo-cyclic hydrocarbon containing one or more closed chains, substantially as described.

11. As a new article of manufacture, an electrical condenser in which the dielectric employed comprises a solid oxygen compound of a halogen substitution product of naphthalene, substantially as described.

12. As a new article of manufacture, an electrical condenser in which the dielectric employed comprises a solid oxygen compound of a halogen substitution product of a carbo-cyclic hydrocarbon containing one or more closed chains, substantially as described.

This specification signed and witnessed this 6th day of November, 1913.

JONAS W. AYLSWORTH.

Witnesses:
 FREDERICK BACHMANN,
 WILLIAM A. HARDY.